April 21, 1964 MASAO KUMANO 3,130,408
SIGNAL DIRECTION FINDER SYSTEM
Filed April 18, 1960
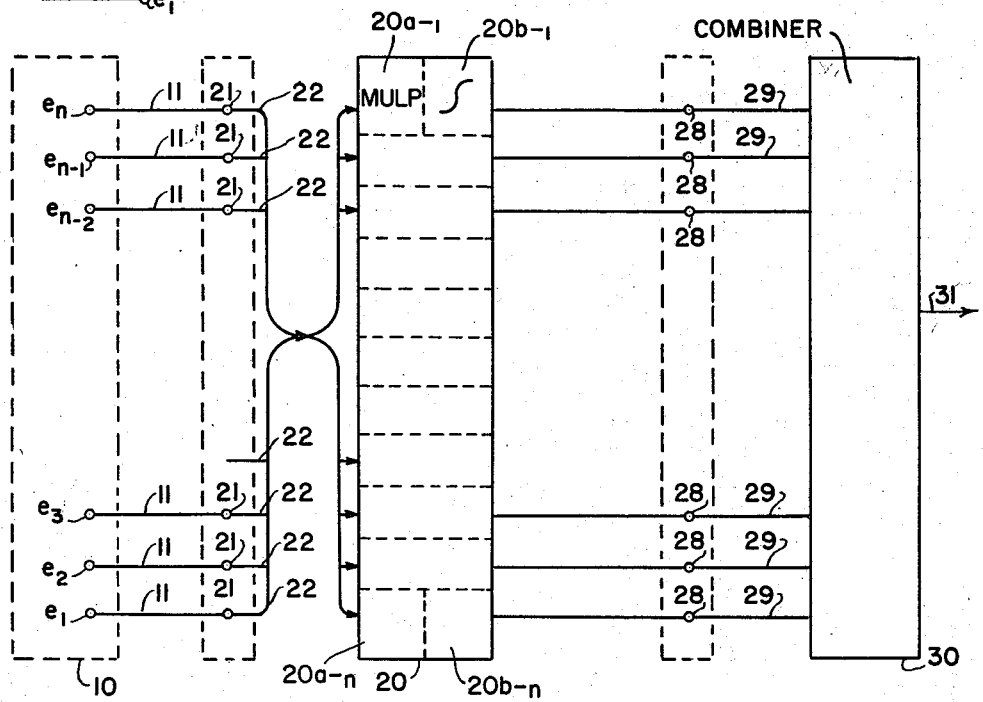
FIG.1
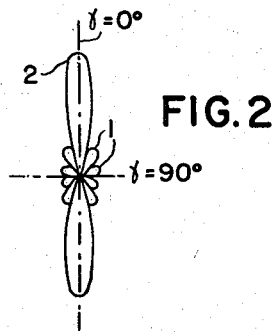
FIG.2
FIG.3
*INVENTOR.*
Masao Kumano

United States Patent Office 3,130,408
Patented Apr. 21, 1964

3,130,408
SIGNAL DIRECTION FINDER SYSTEM
Masao Kumano, Tokyo, Japan, assignor to Nippon Electric Company Limited, Tokyo, Japan, a corporation of Japan
Filed Apr. 18, 1960, Ser. No. 22,853
Claims priority, application Japan Apr. 21, 1959
3 Claims. (Cl. 343—113)

This invention relates to signal direction finder systems. More specifically, the invention relates to devices for finding or determining the direction of signals transmitted by a signal source, which signal source may be either a source of radio signals such as a radio transmitter, or a source of sound wave signals such as used in submarine signalling systems, or the like. As used herein in the specification and claims, the expression "sonic" signals or waves means signal waves in a fluid medium such as air or a liquid, of the audible frequency range as well as of the super-audible or supersonic frequency range.

There are known signal direction finder systems wherein a plurality of signal receptors, such as directional radio aerials for picking up radio signals, or an array of microphones for picking up sound signals from a sound signal source, are arrayed in a plane and the combined signals of the array of such signal pickup receptors is utilized to determine the angle of deviation of the direction of the array of signal receptors from the plane that is aligned with the signal source. However, such known, conventional direction finder systems are effective only if the level of the signals of the source is high relative to the received noise signal, and they are not effective if the source signals are weak compared with the received noise signals.

Among the objects of the invention is a radio direction finder system of the foregoing type, which will enable continuous determination of the direction of the signal source even if the received signals of the source are weak in relation to the noise signals picked up by the signal receptor system.

The foregoing and other objects of the invention will be best understood from the following description of an exemplification of the invention, reference being had to the accompanying drawings, wherein:

FIG. 1 is a diagrammatic view of an array of signal receptor elements arrayed in a plane for determining the angle of deviation of the plane of the receptor elements from the plane through the signal source;

FIG. 2 is a polar graph showing the directional pattern of the output signal voltage from an array of receptor elements shown in FIG. 1, for different deviation angles relatively to the signal source; and FIG. 3 is a block diagram exemplifying a direction finder system of the invention, operating with an array of signal receptors such as shown in FIG. 1.

An example of a prior-art direction finder system operating with an array of receptors such as referred to below in connection with FIG. 1, is described in the publication set forth below, and all contents of said publication are hereby made a part of this application:

"Fundamentals of Sonar," written by J. Warren Horton, published in 1957, by the United States Naval Institute.

FIG. 1 indicates diagrammatically a signal receptor set 10 having a relatively large number of signal receptor elements $e-1$, $e-2$ ... $e-n$, of a conventional known direction finder system, with all signal receptors arrayed or aligned in a plane for determining the deviation of the plane of the arrayed signal receptors from a plane that is aligned with the signal source. If the source of signals consists of a radio transmitter, the receptors $e-1$, $e-2$ ... $e-n$ consist of radio antennae. If the source of signals is a sound source, the signal receptors $e-1$, $e-2$ ... $e-n$ consist of omnidirectional microphones.

In connection with the explanation of the invention given below, the following symbols will be used:

$e$ identifies the number of individual signal receptors $e-1$ to $e-n$ of the array of signal receptors, such as shown in FIG. 1.

$d$ is the distance between each successive pair of receptors $e-1$, $e-2$ ... $e-n$.

$h$ is the signal output voltage of the individual receptors including the noise signal.

$N$ is the output voltage of the noise signals present in the received output voltage $h$.

$(n-1)d$ is the total length of the receptor array.

$S$ is the output voltage of the received wave signals without the noise signals.

$k$ is the wave number of the received signals.

$\gamma$ is the deviation angle between the plane of the arrayed receptors and the plane that is aligned with the signal source.

$\omega o$ and $\alpha e$ are the angular frequency in radians per second, and the phase angle, respectively, of the received source signal, in relation to the standard output signal voltage of the first receptor element.

The output voltage of the signals in each of the receptors $e-1$, $e-2$ ... is $$he(t) = Se(t) + Ne(t) \tag{1}$$

wherein $Se(t)$ is the output voltage of the received signal from the source, and $Ne(t)$ is the output voltage of noise signals.

When the signal source is very distant from the receptors, compared with the total length of the receptor array $(n-1)d$, the receptor output voltage of the received source signal is $$\left.\begin{array}{l} Se(t) = A \sin(\omega o t + \alpha e) \\ \text{where} \\ \alpha e = K(e-1)d \sin \gamma \end{array}\right\} \tag{2}$$

where A and K are constants.

Assuming that no noise is present in the received signal source, and $$Ne(t) = 0$$

the variation in the deviation angle $\gamma$ of the average signal voltage in the integration of output signal voltage $Se(t)$, that is the directionality or deviation coefficient R, is given by, $$R = \frac{\sin \frac{n}{2}kd \sin \gamma}{n \sin \frac{1}{2}kd \sin \gamma} \tag{3}$$

The graph pattern of FIG. 2 shows the deviation coefficient R at different deviation angles for an array of signal receptors of the type shown in FIG. 1, wherein $$n=6 \text{ and } kd=\pi$$

Referring to FIG. 2, in order to make the side lobe 1 of the deviation pattern smaller relatively to the main lobe 2, there may be used the known method of alternating the output voltage $Se(t)$ by degrees from the center to the sides of arrayed receptor elements and thus diversify each output voltage, this method being called "shading." Such action may also be secured with the known Tschebyscheff directional method.

By diversifying each output voltage $Se(t)$ with the phase difference $\phi e$ in accordance with Equation 4 given below, the deviation angle indicating maximum sensitivity is obtained with a main lobe 2 of the directional pattern given by Equation 5.

$$\phi e = (e-1)\phi \tag{4}$$

$$\gamma_{max.} = \sin^{-1} \frac{\phi}{kd} \tag{5}$$

In all such known conventional direction finder systems, the direction of the signal source or the deviation angle of maximum signal output voltage from the source is obtained by mechanically varying the arrangement of the signal receptor elements or electrically varying the phase shift $\phi$ above described. However, it is not possible to determine the direction of the signal source with such known direction finders when the signal output voltage $Se(t)$ for source signals contains a substantial noise output voltage $Ne(t)$.

The direction finder system of the present invention overcomes these difficulties of prior systems and finds clearly the direction of the signal source irrespective of the noise picked up by the directionally-arrayed signal receptors.

The block diagram of FIG. 3 exemplifies one form of direction finder device of the invention. It has a receptor unit 10 which may be identical with similar prior-art receptor units, and carrying and having mounted thereon a plurality of signal receptors $e-1$, $e-2$ . . . $e-n$ all arrayed in a plane, as is conventional. The receptor unit 10 may house a series of conventional signal preamplifiers for individually amplifying the signal of the individual receptors $e-1$, $e-2$ . . . $e-n$, and deliver their signal output to a series of signal input leads 11. A signal correlator 20 has a set of input terminals 21, one for each receptor $e-1$, $e-2$, . . . $e-n$ of receptor unit 10, and a set of output terminals 28, likewise one for each receptor $e-1$, $e-2$ . . . $e-n$ of the receptor unit. The individual input leads 11 from the individual receptor units, are connected to the respective input terminals of the correlator 20 for delivering the source signals received by the individual receptors $e-1$, $e-2$ . . . $e-n$, to the respective individual correlator input terminals 21. The correlator 20 has a set of output terminals 28 to which the correlator 20 delivers a correlated output as described in detail below, and corresponding in a predetermined manner to the signal input supplied to the corresponding correlator input terminals 21. The individual correlator output terminals 28 are shown connected through individual output leads 29 to an output unit 30 which may be identical with corresponding conventional output units of the prior art direction finders operating with a similar array of signal receptors and delivering through output lead 31 a deviation signal which corresponds to and will produce an indication of the deviation angle between the direction of the receptor unit and the direction of the remote object. As an example of such prior art output unit, it may embody the combiner means described in U.S. Patent 2,524,180, Apparatus for Determining the Direction of Underwater Targets, by O. H. Schuck (such as elements 28 and 27 on FIG. 3).

The set of input terminals 21 of the correlator 20 supply thereto the individual source signals of the different receptors $e-1$, $e-2$ . . . $e-n$, through individual source-signal leads 22. The correlator embodies signal-analyzing means of the type used in known computers and calculating means for calculating the cross-correlation function, the input of which are the individual voltage outputs of the individual receptor elements $e-1$, $e-2$ . . . $e-n$, received at correlator input terminals 21, and delivering to corresponding correlator output terminals 28 the value of the calculated cross-correlation function.

The correlator means 20 includes a plurality of multiplier means $20a_{-1}$ through $20a_{-n}$ and integrator means $20b_{-1}$ through $20b_{-n}$ wherein each multiplier means accepts inputs 22 and feeds its output to its associated integrating means $20b_{-1}$ through $20b_{-n}$ respectively. Multiplier means and integrating means set forth herein are of the type commonly used in analog computers such as those described in the publication A Palimpsest on the Electronic Analog Art, printed by Geo. A. Philbrick Researches, Inc., Boston, Mass., A.D. 1955, in the article "An Introduction to Analog Computers" pages 27 through 47 (particularly in page 41) and also in the article "The Electronic Differential Analysers" set forth on pages 48 through 58 (particularly in pages 51 through 53).

As an example of the calculating operations, the correlator 20 is assumed to calculate the cross-correlation function $\phi h_1 he(\tau)$ between the output voltage $h_1(t)$ from the receptor element $e-1$ and the output voltage $he(t)$ ($e=2\sim n$) from each of the other receptor elements $e-2$ . . . $e-n$ thus requiring a total of $n(n-1)$ two-input multipliers. According to the definition of the correlation function, the function $\phi h_1(t) he(t)$ will be given by $$\phi h_1(t)he(t) = \underset{T\to\infty}{Lim} \frac{1}{2T} \int_{-T}^{+T} h_1(t)he(t+\tau)\}dt$$

$$= \underset{T\to\infty}{Lim} \frac{1}{2T} \int_{-T}^{+T} \{S_1(t)+N_1(t)\}\{Se(t+\tau)+Ne(t+\tau)d\tau$$

$$= \underset{T\to\infty}{Lim} \frac{1}{2T} \int_{-T}^{+T} S_1(t)Se(t+\tau)dt$$

$$+ \underset{T\to\infty}{Lim} \frac{+1}{2T} \int_{-T}^{+T} S_1(t)Ne(t+\tau)dt$$

$$+ \underset{T\to\infty}{Lim} \frac{1}{2T} \int_{-T}^{+T} N_1(t)Se(t+\tau)dt$$

$$+ \underset{T\to\infty}{Lim} \frac{1}{2T} \int_{-T}^{+T} N_1(t)Ne(t)dt = \phi S_1 Se(\tau) + \phi S_1 Ne(\tau)$$

$$+ \phi N_1 Se(\tau) + \phi N_1 Ne(\tau) \tag{6}$$

If noise is ergodic and non-coherent with signal, the converted equivalent noise voltage inverted from the noise generated in the equipment connected with the receptor elements $e-1$, $e-2$ . . . $e-n$ to the output noise voltage at the output terminal of their elements may be considered to be non-coherent with the required signal output voltage. By this supposition above, $$\phi S_1 N_e(\tau) = \phi N_1 Se(\tau) = \phi N_1 N_e(\tau) = 0$$

so the formula $h_1 he(\tau)$ will be expressed as $$\phi h_1 he(\tau) = \phi S_1 Se(\tau) \tag{7}$$

$\phi S_1 Se(\tau)$ above may be rewritten by using the formula (2) following:

$$\phi S_1 Se(\tau) = \underset{T\to\infty}{Lim} \frac{1}{2T} \int_{-T}^{+T} A^2 \sin Wot \sin Wo(t+\tau)$$

$$+ K(e-1)d.\sin \gamma dt$$

$$= \underset{T\to\infty}{Lim} \frac{1}{2T} \int_{-T}^{+T} \frac{A^2}{2} \cos \{Wo\tau + K(e-1)d.\sin \gamma\}dt$$

$$- \underset{T\to\infty}{Lim} \frac{1}{2T} \int_{-T}^{+T} \frac{A^2}{2} \cos \{2Wot + Wo\tau + K(e-1)d.\sin \gamma\}dt$$

$$= \underset{T\to\infty}{Lim} \frac{1}{2T} \int_{-T}^{+T} \frac{A^2}{2} \cos \{Wo\tau + K(e-1)d.\sin \gamma\}dt$$

$$= \frac{A^2}{2} \cos \{Wo\tau + K(e-1)d.\sin \gamma$$

That is, $$\phi h_1 he(\tau) = \frac{A^2}{2} \cos \{Wo\tau + K(e-1)d.\sin \gamma\} \tag{8}$$

Comparison of $\phi h_1 he(\tau)$ above with the signal output voltage $Se(t)$ of Formula 2 shows that, corresponding $t$ to $\tau$, the cross-correlation function $\phi h_1 he(\tau)$ between the output voltage $h_1(t)$ (containing noise output voltage) from the receiving element and the output voltage $he(t)$ from the wave element gives substantially the same result as the output voltage neglecting noise from the receiving wave element, that is only signal output voltage, except the value of amplitude and the difference by $\pi/2$ in phase. This directional deviation equipment utilizing the cross-correlation function $\phi h_1 he(\tau)$ in FIG. 3 provides the variation of the output voltage corresponding with the variation of the direction of objects, even if using the conventional directional deviation system. This means, for example, that this invention can provide the directional pattern which suppresses side lobe 1, shown in FIG. 2 and has the deviated main lobe by the angle $\gamma$ max. shown by Formula 5.

The foregoing explanation establishes that the output voltage from output terminal 31 is independent from noise output voltage from the receiving wave-elements, if the cross correlator is complete. This means to be able to obtain ideal S/N characteristics. In practice, the process of calculation of the cross-correlation function may be performed very quickly, and this invention is able to remove the effect of disturbing noise thus enabling effective finding of the direction of signal source, even if the received signals from a far-away signal source are weak.

While I have described an embodiment of the invention in which the receptor elements are spaced equally from each other on a line, this invention is not limited to such arrangement, and can be applied to circular or other arrangements of the receptor elements. Moreover, the direction finders of the present invention may use receptor elements which are not omni-directional and have different sensitivities.

Though the explanation above is made only by the example using the value of the cross-correlation function between the output voltage from a standard receptor element and the output voltage from each other receptor element, it is apparent that this invention permits obtaining the same result even in using the value of the cross-correlation function between a locally supplied signal voltage which may be correlated with the output voltages of the arrayed signal receptors. The receiving signal wave in the foregoing explanations is intended to describe not only signals emitted from a signal source, but also signals reflected from a remote object.

It will be apparent to those skilled in the art that the novel principles of the invention disclosed herein in connection with a specific exemplification thereof, will suggest various other modifications and applications of the same. It is accordingly desired that in construing the breadth of the appended claims they shall not be limited to the specific exemplification of the invention described above.

I claim:

1. In a signal direction finder system for determining the direction of a remote object by signals transmitted therefrom, an array of a plurality of "$n$" individual signal receptors arrayed in a predetermined manner and fixing the receptor direction for delivering, respectively, corresponding "$n$" individual receptor signals, wherein "$n$" is at least four, combining means having a plurality of "$n$" individual receiving terminals corresponding, respectively, to said "$n$" receptors and operative in response to all received individual receptor signals for producing a resultant deviation output signal corresponding to the deviation angle of said receptor direction from the object direction, and suppressor means including a set of "$n$" input terminals and a set of "$n$" output terminals corresponding, respectively, to and connected between said individual "$n$" receptors and to said "$n$" receiving terminals, and "$n$" correlating means correspoding to and connected between the individual "$n$" input and "$n$" output terminals of said suppressor means, each of said "$n$" correlating means being also interconnected with all others of said input terminals for correlating the received receptor signal with all other receptor signals and responsive thereto to produce a corresponding noise-clear receptor signal which is substantially free of noise signals, said suppressor means including a plurality of multiplying means sufficient in number to generate the cross-correlation function between each receptor signal; a plurality of means for integrating the output of said multiplying means connected to each of said multiplier means.

2. In a signal direction finder system for determining the direction of a remote object by signals transmitted therefrom, an array of a plurality of "$n$" individual signal receptors arrayed in a predetermined manner and fixing the receptor direction for delivering, respectively, corresponding "$n$" individual receptor signals, wherein "$n$" is at least four, combining means having a plurality of "$n$" individual receiving terminals corresponding, respectively, to said "$n$" receptors and operative in response to all received individual receptor signals for producing a resultant deviation output signal corresponding to the deviation angle of said receptor direction from the object direction, and suppressor means including a set of "$n$" input terminals and a set of "$n$" output terminals corresponding, respectively, to and connected between said individual "$n$" receptors and to said "$n$" receiving terminals, said suppressor means including correlating means responsive to the individual outputs of said "$n$" receptors and operative to supply to said combining means corresponding "$n$" correlated signals, which correlated signals are correlated to a cross-correlation function between said individual receptor outputs and a selected standard output, said suppressor means including a plurality of multiplying means sufficient in number to generate the cross-correlation function between each receptor signal; a plurality of means for integrating the output of said multiplying means connected to each of said multiplier means.

3. In a signal direction finder system for determining the direction of a remote object by signals transmitted therefrom, an array of a plurality of "$n$" individual signal receptors arrayed in a predetermined manner and fixing the receptor direction for delivering, respectively, corresponding "$n$" individual receptor signals, wherein "$n$" is at least four, combining means having a plurality of "$n$" individual receiving terminals corresponding, respectively, to said "$n$" receptors and operative in response to all received individual receptor signals for producing a resultant deviation output signal corresponding to the deviation angle of said receptor direction from the object direction, and suppressor means including a set of "$n$" input terminals and a set of "$n$" output terminals corresponding, respectively, to and connected between said individual "$n$" receptors and to said "$n$" receiving terminals, said suppressor means including correlating means responsive to the individual outputs of said "$n$" receptors and operative to supply to said combining means corresponding "$n$" correlated signals, which correlated signals are correlated to a cross-correlation function between said individual receptor outputs and the output of a selected standard receptor, said suppressor means including a plurality of multiplying means sufficient in number to generate the cross-correlation function between each receptor signal; a plurality of means for integrating the output of said multiplying means connected to each of said multiplier means.

References Cited in the file of this patent

UNITED STATES PATENTS 2,524,180    Schuck _____ Oct. 3, 1950

OTHER REFERENCES

The Journal of the Acoustical Society of America, vol. 29, No. 12, December 1957, pp. 1342–1347.